United States Patent [19]

Matsuda et al.

[11] 4,275,377
[45] Jun. 23, 1981

[54] ALARM DEVICE FOR INFORMING REDUCTION OF PNEUMATIC PRESSURE OF VEHICLE TIRES

[75] Inventors: Akira Matsuda, Higashimurayama; Norio Goshima, Musashino; Shigeo Yasuda, Musashino; Motoaki Iwasaki, Musashino; Hiroshi Nishino, Musashino, all of Japan

[73] Assignees: Bridgestone Tire Co., Ltd., Tokyo; Mitaka Instrument Co., Ltd., Musashino, both of Japan

[21] Appl. No.: 49,830

[22] Filed: Jun. 18, 1979

[30] Foreign Application Priority Data

Jun. 20, 1978 [JP] Japan .................................. 53-75033

[51] Int. Cl.³ ..................... B60C 23/04; G08B 21/00
[52] U.S. Cl. ..................................... 340/58; 73/146.5
[58] Field of Search ............ 340/58; 200/61.22, 61.25; 73/146.5

[56] References Cited

U.S. PATENT DOCUMENTS

| | | | |
|---|---|---|---|
| 3,383,654 | 5/1968 | Hendrichs | 200/61.22 X |
| 3,613,075 | 10/1971 | Griffiths et al. | 340/58 |
| 3,840,850 | 10/1974 | Whiteing et al. | 73/146.5 X |
| 4,064,482 | 12/1977 | Maisch et al. | 200/61.25 X |
| 4,086,564 | 4/1978 | Claxton | 340/58 |
| 4,110,732 | 8/1978 | Jarocha et al. | 340/58 |

Primary Examiner—John W. Caldwell, Sr.
Assistant Examiner—Joseph E. Nowicki
Attorney, Agent, or Firm—Sughrue, Rothwell, Mion, Zinn and Macpeak

[57] ABSTRACT

An alarm device for signalling a reduction of pneumatic vehicle tire pressure comprises an oscillator 6 having an oscillation coil secured to a chassis of a vehicle; and a resonator 1 secured to the peripheral portion of a wheel having a tire adjacent to the oscillation coil and consisting of a pressure switch 4 for sensing an abnormal tire pressure change and a resonance coil and a capacitor 5 tuned to an electromagnetic wave radiated from the oscillation coil. A signal processing device contains a means for sensing a change in an oscillation condition generated in the oscillator due to a resonant condition of the resonator switched on and off in accordance with abnormal internal tire pressure and for processing a signal from the sensing means; and an alarm for generating a warning signal in accordance with the output of the signal processing device. The latter comprises a signal input section 21 having a desired number of input terminals, a signal processing section 22 having an arithmetic circuit connected to the signal input section, a resettable latch circuit 30,32, and an alarm section 23 operated by the output of the latch circuit whereby an alarm signal is not generated at normal internal pressure and during stops of the vehicle.

3 Claims, 5 Drawing Figures

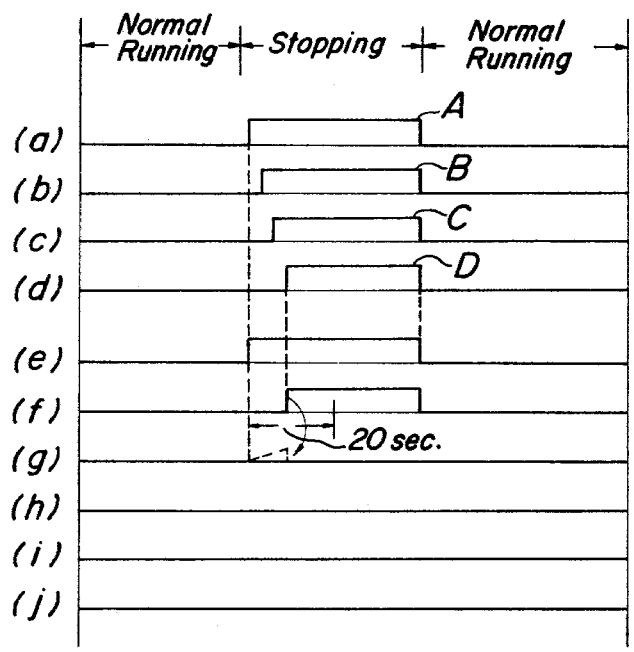
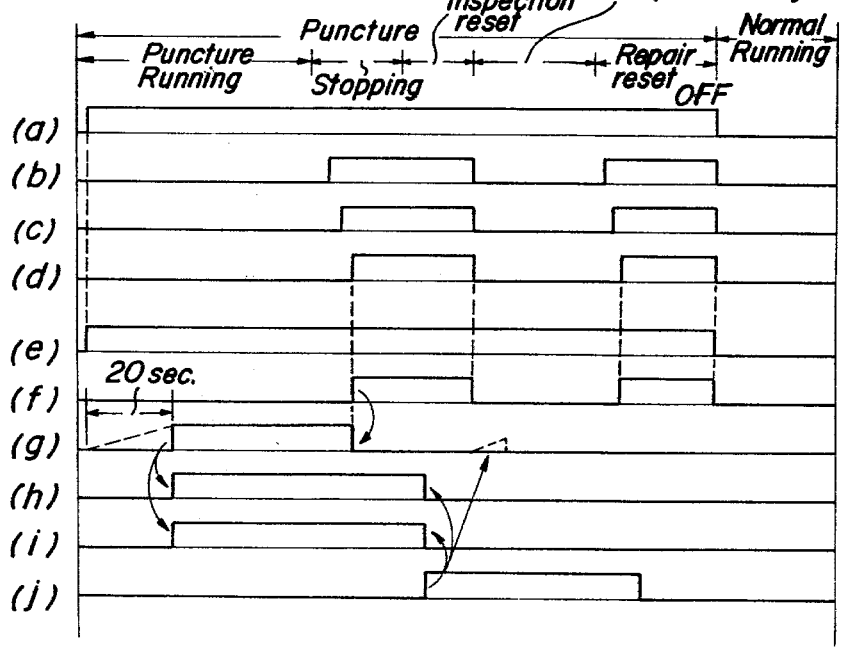

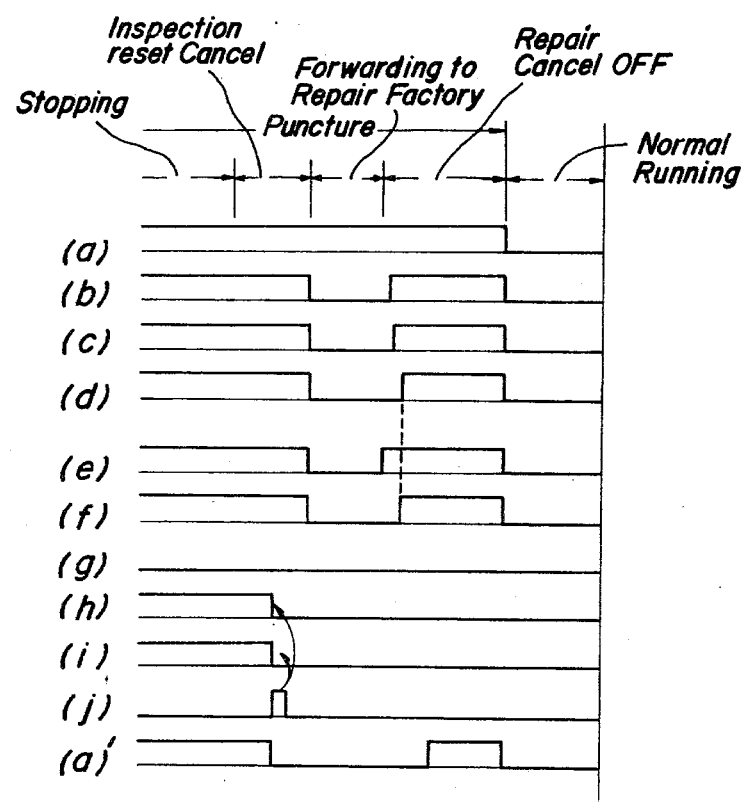

ALARM DEVICE FOR INFORMING REDUCTION OF PNEUMATIC PRESSURE OF VEHICLE TIRES

BACKGROUND OF THE INVENTION

The present invention relates to an alarm device for signalling a informing reduction of the pneumatic pressure of vehicle tires with the aid of a resonance phenomenon of electromagnetic coupling.

As alarm devices for sensing abnormal change of an internal pneumatic pressure of vehicle tires when running and for informing it to a driver, mention may be made of a signal transmission system and a resonance phenomenon of electromagnetic coupling.

An alarm device with the aid of a signal transmission system, in case of adopting it as, for example, unattended operation of a new traffic system or an automatic train stop device, requires a transmitter and a receiver for every one of a plurality of rolling stocks or vehicles for constructing one train, so that its construction becomes complicated and expensive, while it is necessary to prevent interference between transmitters and receivers of each vehicle.

An alarm device with the aid of a resonance phenomenon of electromagnetic coupling, as apparent from Japanese Patent Application No. 150,235/76 and Japanese Patent Application Publication No. 150,236/76, solves a problem of the signal transmission system, but a light emitting diode or a lamp is energized or lighted when stopping even if an internal pneumatic pressure is normal and then an alarm is undesirably generated. Conversely speaking, it means automatic inspection whether the circuit of the alarm device is normally operated.

However, even if the pneumatic pressure of a tire is normal as described above and if an alarm is generated when stopping, when a means for appealing the sense of hearing such as a buzzer or the like is employed as an alarm device, the alarm buzzer is annoyingly rung at every stopping and such buzzer cannot be used for unattended operation of a new traffic system or automatic train stop device or the like.

SUMMARY OF THE INVENTION

An object of the present invention is to eliminate the above described disadvantages of the conventional alarm device.

Another object of the present invention is to provide an alarm device for informing reduction of pneumatic pressure of vehicle tires, which is so properly constructed and arranged that an alarm signal by means of a buzzer is not generated when a pneumatic pressure of a tire is normal and a train is stopped.

The present invention is formed on the basis of the recognition that in case of a vehicle having four wheels, such condition is set that pneumatic pressures of four wheels do not simultaneously become reduced.

An alarm device for informing reduction of pneumatic pressure of vehicle tires according to the present invention comprises an oscillator having an oscillation coil secured to a chassis side of a vehicle; a resonator secured to the peripheral portion of a wheel having a tire adjacent to the oscillation coil and consisting of a pressure sensing switch operated by sensing abnormal change of pneumatic pressure of vehicle tire, a resonance coil and a capacitor which are resonated with an electromagnetic wave radiated from the oscillation coil; a signal processing device containing a sensing means for sensing change in an oscillation condition generated in the oscillator due to a resonant condition of the resonator switched on and off in accordance with abnormal internal pressure of the tire and for processing a signal sensed by the sensing means; and an alarm means for generating a warning signal in accordance with the output of the signal processing device. The signal processing device comprises a signal input section having a desired number of input terminals, a signal processing section having an arithmetic circuit connected to the signal input section, a latch circuit and a reset circuit thereof, and an alarm section operated by the output of the latch circuit whereby an alarm signal is not generated at normal internal pressure and during stop of the vehicle. The signal processing section comprises an AND gate and an OR gate parallel arranged with each other and each having same numbers of input terminals as the number of the output terminals of the signal input section, a delay circuit having a first and a second input terminals connected to the output sides of the AND gate and the OR gate, a first latch circuit having a second input terminal connected to the output side of the delay circuit and latch elements of same number as that of the input terminal of the signal input section, a second latch circuit having a first input terminal connected to the output side of the delay circuit and a first input terminal connected to the output side of the delay circuit and consisting of a single latch element, and an alarm reset circuit connected to a third input terminal of the first latch circuit and a third input terminal of the delay circuit, respectively, and having a switch for resetting an alarm signal. The alarm section comprises a photocoupler and a relay connected to the second latch circuit thereby to generate and display an alarm at a remote place. The signal processing section further comprises a switch for canceling the input of the pressure reduction sensed signal provided between the signal input terminal of the signal input section and the OR gate of the signal processing section whereby the reduction of normal wheels can again be performed by releasing switch contact flowing the pressure reduction sensed signal therethrough.

BRIEF DESCRIPTION OF THE DRAWINGS

FIG. 3 is a waveform for explaining the action of the alarm device according to the present invention when normally running and stopping;

FIG. 4 is a waveform for explaining the operation of the alarm device according to the present invention in case of forwarding the troubled train or vehicle to a repair factory when abnormal pressure of the vehicle is sensed and full functions of the vehicle is stopped; and FIG. 5 is a waveform for explaining the operation of the alarm device according to the present invention capable of alarming the reduction of pneumatic pressure in case of forwarding the troubled train or vehicle to a repair factory when abnormal pressure of the vehicle is sensed and the function of the troubled vehicle is only stopped.

DESCRIPTION OF THE PREFERRED EMBODIMENT

Figure 1:
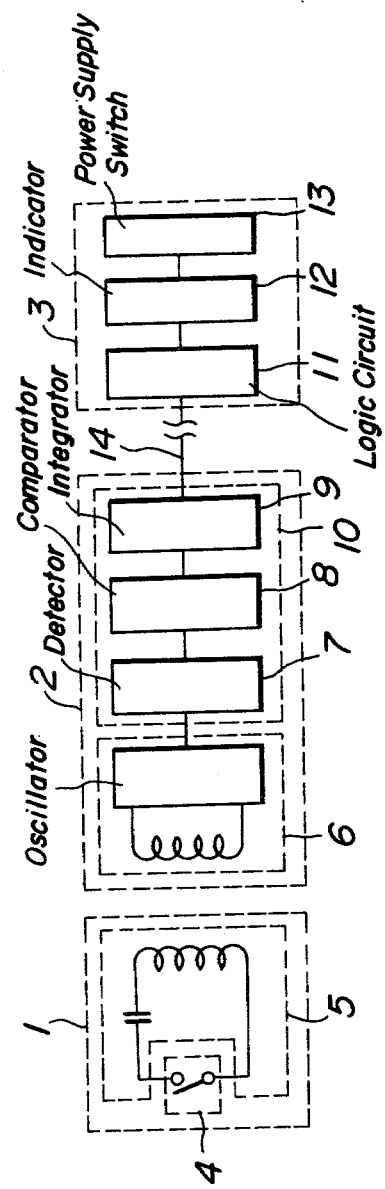
FIG. 1 is a block diagram showing the construction of a conventional alarm device for informing reduction of pneumatic pressure of vehicle tires with the aid of a resonance phenomenon of electromagnetic coupling.

FIG. 1 shows a conventional alarm device for signalling a reduction of pneumatic pressure of vehicle tires. This alarm device comprises a resonant section 1, an oscillation section 2 and an alarm section 3. The resonant section 1 includes an internal pneumatic pressure sensing switch 4 and a resonator 5 consisting of a series combination of a coil and a capacitor. The oscillation section 2 includes an oscillator 6 consisting of a series of parallel circuit of an oscillation coil and a capacitor and an oscillation circuit, and a signal processing device 10 consisting of a detector 7 for detecting the output of the oscillator 6, a comparator 8 for comparing the output thereof and an integrator 9 for integrating the output thereof. The alarm section 3 comprises a logic circuit 11 for logically operating on the output of the integrator 9, an indicator or alarm device 12 and an electric power supply switch 13. In this case, the output of the integrator in the oscillation section 2 is connected to the logic circuit 11 of the alarm section 3 through a cable 14.

According to such circuit arrangement, an alarm signal is generated when not only the internal pneumatic pressure of a tire is reduced but also a vehicle is stopped even if the tire pressure is normal, and particularly in case of using a buzzer as an alarm device, the buzzer is annoyingly rung at every stop.

The invention is properly constructed and arranged so as not to generate an alarm signal nor ring an alarm device (buzzer) when the internal pneumatic pressure is normal even if a vehicle is stopped.

Figure 2:
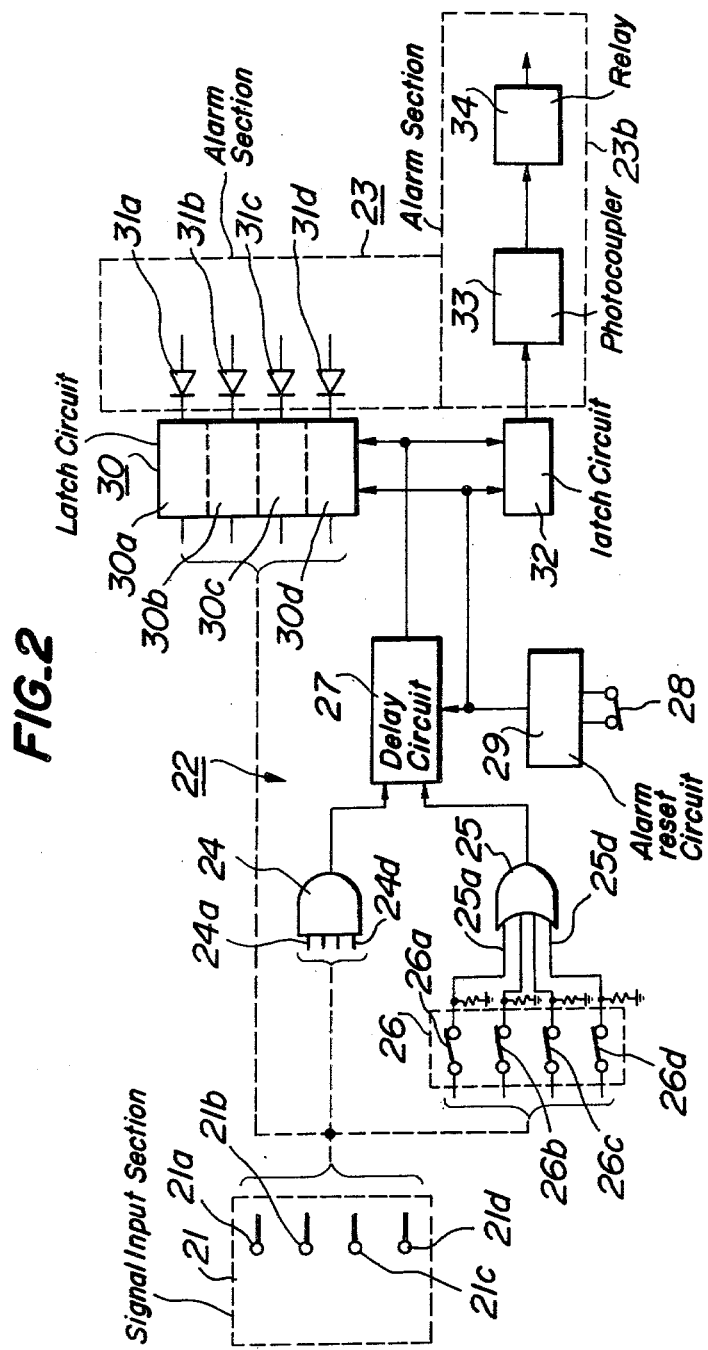
FIG. 2 is a diagram showing one embodiment of an alarm device for informing reduction of pneumatic pressure of vehicle tires having a signal processing device according to the present invention.

The signal processing device according to the invention, as shown in FIG. 2, comprises a signal input section 21, a signal processing section 22 and an alarm section 23. To four input terminals 21a, 21b, 21c and 21d of the signal input section 21 are supplied the outputs of alarm devices, i.e., the outputs of the integrator 9 shown in FIG. 1, provided in each tire (the number of tires is four based on the above precondition in this embodiment).

The signal processing section 22 comprises an AND gate 24, an OR gate 25 connected in parallel thereto, a reduced pressure senses signal input cancel switch 26 provided at the input side of the OR gate 25, a delay circuit 27 consisting of a counting circuit having first and second input terminals connected to the output side of the AND gate 24 and the output side of the OR gate 25, respectively, an alarm reset circuit 29 connected to a third input terminal of the delay circuit 27 and having input terminal connected to an alarm signal reset switch 28, and first and second latch circuits 30 and 32 having first and second input terminals connected to the output terminal of the delay circuit 27 and the output terminal of the alarm reset circuit 29, respectively. In this case, the AND gate 24 and the OR gate 25 are made into a four-input type, respectively, in accordance with the number of input terminals of the signal input section 21 and the reduced pressure sensed signal input cancel switch 26 is also made into a type having four switch contacts 26a–26d. The latch circuit 30 also comprises four latch elements 30a–30d. Therefore, four input terminals of the AND gate 24, four input terminals of the OR gate 25 and four latch elements 30a–30d of the latch circuit 30 are connected to four input terminals 21a–21d of the signal input section 21, respectively, in parallel to each other. In case that the alarm device having such circuit arrangement is provided in a train consisting of a plurality of vehicles described later on, the first latch circuit 30 consisting of four latch elements is provided in each vehicle, but the second latch circuit 32 consisting of a single latch element is provided in a driver's cab in a number corresponding to the number of vehicles.

Further, the alarm section 23a comprises four light emitting elements, for example, light emitting diodes 31a–31d, and each cathode of these light emitting diodes 31a–31d is connected to latch elements 30a–30d respectively.

The alarm section 23b comprises a photocoupler 33 connected to the output side of the second latch circuit 32 and a relay 34 provided at the output side thereof. This relay 34 actuates the alarm device provided in the driver's cab of a train or a central control room of unattended operation.

The action of the signal processing device according to the present invention will be explained with reference to FIG. 3. The signal processing device according to the present invention will be explained by referring to the case of applying to a train with the use of tire wheels coupling a plurality of vehicles, such as monorails, subways and the like, but the present invention is not limited to the above but can be applied to common two-wheeled vehicles, three-wheeled vehicles and four-wheeled vehicles or any vehicles having a number of wheels, such as motorcycles, passenger cars, trucks, buses, aircrafts and the like. In case of aircrafts, however, wheels are controlled by a high air pressure apart from a common low air pressure control, but when a prescribed pressure value of the tire internal pneumatic pressure sensing switch 4 shown in FIG. 1 is properly adjusted, the signal processing device according to the present invention can be applied to both the low air pressure controlled wheels and the high air pressure controlled wheels.

At first, the operation of the signal processing device according to the present invention when the internal pneumatic pressure of a tire is normal and the vehicle is stopped will be explained. Now, supposing that from the input terminal 21a to the input terminals 21b, 21c and 21d of the signal input section 21 enter a high level signal detected during the stopping of the vehicle shown in FIGS. 3a–3d in succession, these signals successively arrive at four input terminals 24a–24d of the AND gate 24 and four input terminals 25a–25d of the OR gate 25, respectively, and related signals, for example, signals A, B, C and D, simultaneously arrive at terminals 24a and 25a, 24b and 25b–24d and 25d relating to the AND gate 24 and the OR gate 25. In this case, the switch contacts 26a–26d of the reduced pressure sensed signal input cancel switch 26 are closed, respectively.

Therefore, from the instant when the high level signal A arrives at the input terminal 25a, the OR gate 25 generates a high level signal shown in a stop section of FIG. 3e at its output terminal and continues to generate it from the output terminal, until high level signals B-D are successively supplied to all the input terminals 25b–25d and all the input terminals become low level signals. The AND gate 24 generates a high level signal shown in the stop section of FIG. 3f at the time when the signal A arrives at the input terminal 24a, the signals B and C successively arrive at the input terminals 24b and 24c and the signal D finally arrives at the input terminal 24d. The delay circuit 27 is set at the instant when a high level output signal of the OR gate 25 is received, starts to count delay time, and continues to count until it is reset by the reception of a high level output signal of the AND gate 24. This delay circuit 27 is constructed to generate an output signal when 5-30 seconds, particularly 20 seconds passed after starting the counting. The instant from arrival of the input signal A to the input terminal 21a to arrival of the input signal D to the input terminal 21d, i.e., the time from the setting of the delay circuit 27 to the resetting thereof, is determined to be within 5-30 seconds, particularly within 20 seconds required for generating an output signal.

With such construction, even if a vehicle is stopped, an alarm particularly a buzzer never sounds in a driver's cab or a central control room.

The operation of the signal processing device when the internal pneumatic pressure of a tire is abnormal, i.e., when at least one of four tires is punctured or reduced to less than a normal value of the pneumatic pressure during the running will be explained with reference to FIG. 4. If a high level signal A generated by sensing an abnormal tire pneumatic pressure, and shown in a puncture running section of FIG. 4a arrives at the input terminal 21a of the signal input section 21 through the cable 14 (FIG. 1), this signal A is simultaneously supplied to the input terminal 24a of the AND gate 24, the input terminal 25a of the OR gate 25 and the latch element 30a of the first latch circuit 30. A high level signal shown in a puncture running section of FIG. 4e is then generated from the OR gate 25, and this signal sets the delay circuit 27 and the counting is started. When the abnormal senses signal A becomes a high level this high level is maintained until the abnormal state of an internal pneumatic pressure is released, as shown in the puncture running section-repair section of FIG. 4a, so that the delay circuit 27 generates an output signal shown in a puncutre running section of FIG. 4g at its output side after an elapsed time of for example 20 seconds, and this signal is supplied to the first latch circuit 30 and to the second latch circuit 32. When the first latch circuit 30 is triggered, the signal A has already been supplied to the latch element 30a from the input terminal 21a of the signal input section 21, so that a current shown in the puncture running section of FIG. 4h flows into the latch element 30a and then the light emitting element 31a or buzzer as an alarm device is energized or rung.

When the second latch circuit 32 is set, its latch element is actuated and a signal as shown in the puncture running section of FIG. 4i is generated at its output side, thereby energizing a light emitting element of the photocoupler 33 and operating the relay 34 by the output signal thereof. The output signal of this relay 34 operates the light emitting element or buzzer as an alarm device provided at a remote position, for example, a driver's cab in the train or the central control room in the unattended operation. By this alarm, a driver or a supervisor in the central control room stops a vehicle or a train. Therefore, at the time when high level signals B, C and D generated by sensing the stopping of the vehicle and shown in stop sections of FIGS. 4a, 4c and 4d arrive at the input terminals 21b, 21c and 21d, and when the signal D arrives at the input terminal 24d of the AND gate 24, a signal shown in the stop section of FIG. 4f is generated at the output side of the AND gate 24, and this signal converts a high level output signal of the delay circuit 27 shown in the stop section of FIG. 4g to a low level. At this point, the alarm signal is still latched. At the time when a train or vehicle is stopped, the driver or supervisor in the central control room inspects vehicles where the abnormal pneumatic pressure is generated and confirms the wheel where the abnormal pneumatic pressure is generated, and thereafter, pushes the alarm signal reset switch 28, actuates the alarm reset circuit 29, releases the operations of the first latch circuit 30 and the second latch circuit 32 or the delay circuit 27 as shown in inspection sections of FIGS. 4h and 4i by the output signal of the alarm reset circuit 29 shown in an inspection section of FIG. 4j so as to release an alarm by the light emitting diode 31a or buzzer, and then forwards the train or the vehicle to a repair shop or factory, removes the cause of the abnormal pneumatic pressure, repairs the train or the vehicle, and thereafter, releases the alarm signal reset switch 28, and runs the train or vehicle again with a normal pneumatic pressure. When forwarding the train as described above, the delay circuit 27 starts counting because of the high level signal A of the input terminal 21a of the signal input section 21, but in this case, the delay circuit 27 does not count in practice since the reset signal is continued by the output of the reset circuit 29 as shown in the inspection section of FIG. 4j and the forward section of FIG. 4g.

The present invention also can sense the abnormal pneumatic pressure state of the other normal vehicles in case of forwarding the troubled train or vehicle to the repair factory. This case will be explained with reference to FIG. 5.

This embodiment is same as that explained with respect to FIG. 4 from the sensing of the abnormal pneumatic pressure to the stopping of the train or vehicle, so that the operation during this period is omitted. In this embodiment, if the abnormal pneumatic pressure sensed signal A shown in the stop section of FIG. 5a has already arrived at the input terminal 21a, after confirmation of the wheel having the abnormal pneumatic pressure detected by inspection and before forwarding to the repair factory, the alarm signal reset switch 28 is thrown to generate a signal shown in the inspection section of FIG. 5j from the alarm reset circuit 29, the output signals of the first latch circuit 30 and the second latch circuit 32 are made low level by this signal as shown in the inspection sections of FIGS. 5h and 5i so as to release the latch action and to be ready to operate the next action, while the switch contact 26a of the reduced pressure sensed signal input cancel switch 26 is released, a high level signal arrived at the input terminal 25a of the OR gate 25 is forcedly converted into a low level signal shown in the inspection section of FIG. 5a', and thereafter, it is supposed that the low level signal shown in the forwarding section of FIG. 5a' always arrives during forwarding.

When an abnormal pneumatic pressure is generated in any one of the other three wheels during forwarding and a high level signal generated by sensing a reduced pressure arrives at terminals relating to the input terminals 21b, 21c and 21d of the signal input section 21, a train or a vehicle is again stopped in the same manner as explained in FIG. 4. Thus, after the vehicle having the abnormal pneumatic pressure is inspected, the contact relating to the reduced pressure sensed signal input cancel switch 26 shown in FIG. 2 is released, and a forwarding to the repair factory capable of detecting an abnromal pneumatic pressure is continued to the remaining normal vehicles. After repaired the troubled vehicle forwarded to the repair factory, all of the contacts 26a-26d of the reduced pressure sensed signal input cancel switch 26 are thrown and a train or a vehicle is again normally operated.

In the signal processing device with such arrangement according to the present invention, in case of applying it to a train having a plurality of vehicles coupled with each other light emitting elements 31a-31d of the alarm section 23a are mounted to each vehicle and the photocoupler 33, the relay 34 and the alarm device such as a light emitting element or a buzzer of the alarm section 23b, are preferably arranged in the driver's cab of a train or the central control room of unattended operation in desired numbers corresponding to the number of vehicles.

When the signal processing circuit according to the present invention is applied to a single vehicle, such as passenger car, truck, bus, aircraft or the like, the alarm section 23b is omitted but the light emitting elements 31a-31d of the alarm section 23a are only provided in the driver's cab and these light emitting elements 31a-31d can be used together with buzzers.

As apparent from the above, the present invention can provide an alarm device for informing reduction of pneumatic pressure of vehicle tires, which never generates an alarm to a driver's cab when a pneumatic pressure is normal and a vehicle is stopped, makes the other normal vehicles again alarmable when sensing any abnormal pneumatic pressure and forwarding the trouble train or vehicle, and is particularly preferable to arrange in a train composed by coupling a plurality of vehicles or in a central control room in such train of unattended operation.

The invention is not limited to the above embodiments but can be modified variously. For example, the above embodiment is explained with the case of four wheels, but it is possible to decrease or increase the number of wheels, such as 3, 6, 8 or more than that. In this case, the number of input terminals of the signal input section, input terminals of the AND gate, input terminals of the latch circuit can correspond to the number of wheels, such as 3, 6, 8 or more than that. Further, any arithmetic circuit can be used other than that described in the foregoing, and any other delay circuit is naturally usable other than the counter.

What is claimed is:

1. In an alarm device for signalling a reduction of the pneumatic pressure of vehicle tires including an oscillator (6) having an oscillation coil secured to a chassis of a vehicle; a resonator (1) secured to a peripheral portion of a wheel having a tire adjacent to the oscillation coil and including a pressure sensing switch (4) responsive to an abnormal change of the pneumatic pressure of said vehicle tire, a resonant coil and a capacitor (5) which are tuned to an electromagnetic wave radiated from the oscillation coil; a signal processing device (3) containing means for sensing a change in an oscillation condition generated in the oscillator due to a resonant condition in the resonator switched on and off in accordance with abnormal internal pressure of the tire and for processing a signal sensed by the sensing means; and an alarm means for generating a warning signal in accordance with the output of the signal processing device; the improvements characterized by: the signal processing device including a signal input section (21) having a desired number of input terminals, a signal processing section having an arithmetic circuit connected to the signal input section and comprising an AND gate (24) and an OR gate (25) connected in parallel with each other and each having the same number of input terminals as the number of output terminals of the signal input section and individually connected thereto, a delay circuit (27) having first and second input terminals connected to outputs of the AND gate and the OR gate, a first latch circuit (30) having a second input terminal connected to an output of the delay circuit and a plurality of latch elements equal in number to the output terminals of the signal input section and having first input terminals individually connected thereto, a second latch circuit (32) having a first input terminal connected to the output of the delay circuit and consisting of a single latch element, and an alarm reset circuit (29) connected to a third input terminal of the first latch circuit, to a second input terminal of the second latch circuit, and to a third input terminal of the delay circuit, respectively, and having a switch (28) for resetting an alarm signal, and an alarm section operated by outputs of the first and second latch circuits, whereby an alarm signal is not generated at normal internal pressure and during stops of the vehicle.

2. An alarm device as claimed in claim 1, wherein the alarm section comprises a photocoupler (33) and a relay (34) connected to the output of the second latch circuit to generate and display an alarm at a remote place.

3. An alarm device as claimed in claim 1, wherein the signal processing section further comprises a switch (26) for canceling the input of the pressure reduction sensed signal provided between the signal input terminal of the signal input section and the OR gate of the signal processing section.

* * * * *